United States Patent

Miller et al.

[11] 3,881,617
[45] May 6, 1975

[54] MATERIAL HANDLING APPARATUS

[75] Inventors: William T. Miller, Cleveland; William G. Morgan, Brecksville, both of Ohio

[73] Assignee: Apex Welding, Incorporated, Bedford, Ohio

[22] Filed: Apr. 2, 1973

[21] Appl. No.: 346,842

[52] U.S. Cl. ............................................... 214/315
[51] Int. Cl. .............................................. B65g 65/34
[58] Field of Search ........... 214/145, 302, 303, 313, 214/315, 317, 620, 706

[56] References Cited
UNITED STATES PATENTS

| | | | |
|---|---|---|---|
| 2,304,649 | 12/1942 | McDaniels | 214/313 |
| 3,013,684 | 12/1961 | King et al. | 214/315 |
| 3,167,197 | 1/1965 | Lee | 214/313 |
| 3,356,241 | 12/1967 | Varilek | 214/750 |

FOREIGN PATENTS OR APPLICATIONS

| | | | |
|---|---|---|---|
| 870,974 | 2/1953 | Germany | 214/317 |

*Primary Examiner*—Robert J. Spar
*Assistant Examiner*—Lawrence J. Oresky
*Attorney, Agent, or Firm*—Woodling, Krost, Granger & Rust

[57] ABSTRACT

A material-containable hopper and a hopper lifting device adapted to be carried and moved by an industrial lift truck, the hopper and device having such complementary parts designed and arranged for the ready grasping and lifting of the hopper and the tilting thereof. This is an abstract only of the specific illustration of the invention given by way of example, and is not to be used in the interpretation of the claims nor as a limitation on the scope of the invention.

6 Claims, 5 Drawing Figures

PATENTED MAY 6 1975

MATERIAL HANDLING APPARATUS

Our invention is directed to material handling equipment wherein a specially constructed hopper and a specially constructed hopper lifting device may be connected and disconnected as desired and the hopper lifted by the elevatable part of an industrial lift truck, and the hopper tilted forwardly to empty the same as desired.

Another object is the provision of an improved combination of hopper and hopper lifting device adapted to be elevated and carried by an industrial lift truck whereby the hopper may be moved to a desired location and the hopper there tilted to drop out the contents of the hopper.

Another object is to facilitate the handling of a material-containable hopper for lifting, moving, and dumping of the same.

Another object is the provision for increased safety and convenience in the operation of lifting, moving and dumping hoppers adapted to contain material.

Other objects and a fuller understanding of this invention may be had by referring to the following description and claims, taken in conjunction with the accompanying drawings, in which:

In FIG. 1 the hopper has been raised to an elevated position;

Figure 1:
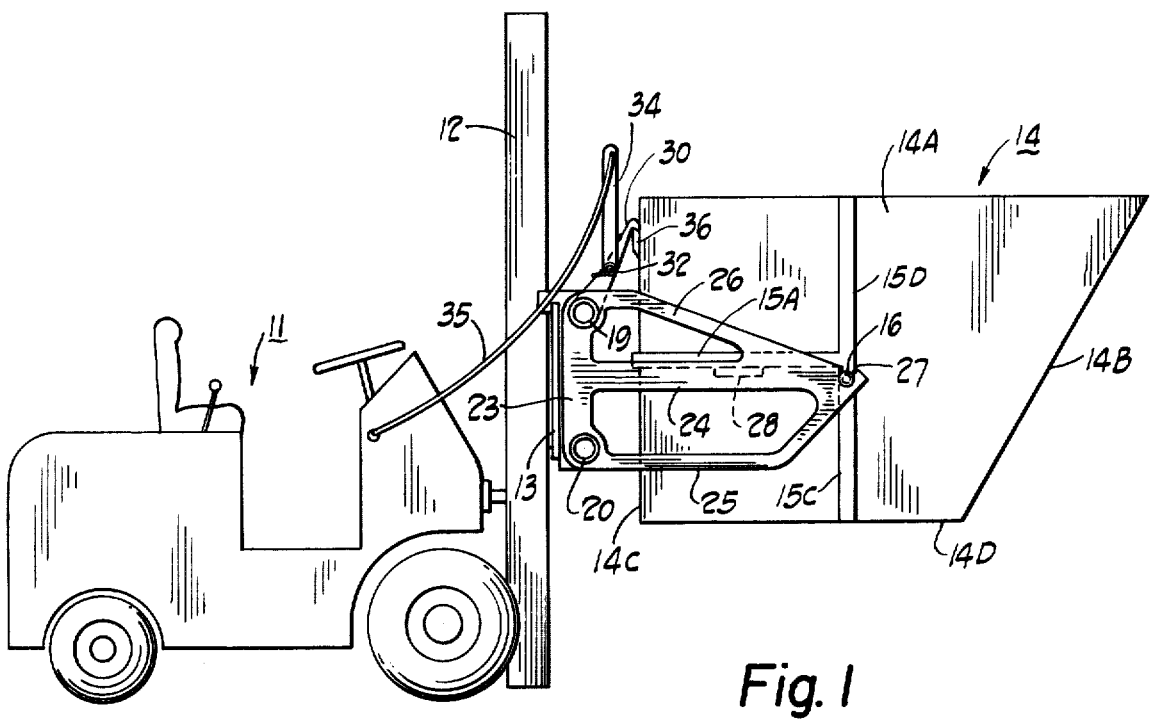
FIG. 1 is a side view of an industrial lift truck upon which our improved lifting device is mounted, the lifting device carrying thereon our improved hopper.

Our invention is adaptable for use with the usual industrial lift trucks having a vertical forward mast and a load supporting member elevatable along the mast and carried thereby. In the drawings the industrial lift truck is denoted generally by the reference character 11. The forward vertically disposed mast is denoted generally by the reference character 12. There is an elevatable load supporting member 13 carried by the mast 12. This load supporting member 13 may be raised and lowered by hydraulic piston and cylinder assemblies, by chains, or by other suitable and usual means embodied in the masts of the usual industrial lift trucks. Structures of such lift trucks, masts and load supporting members carried thereby are generally known in the trade. In this instance, the load supporting member 13 is a plate extending transversely and forwardly of the mast and which is raised and lowered by the elevating mechanism within the mast.

Our hopper is denoted generally by the reference character 14. It is preferably made of sheet metal and fabricated in the usual manner. It has two parallel opposite side walls 14A joined at their forward edges by a slanted front wayl 14B. There is a bottom wall 14D and extending up from the bottom wall 14D along the rear edges of the side wall 14A is a straight rear wall 14C.

As shown, the hopper 14 has an open upper end through which material may be charged and discharged. By reason of the construction with the slanted forward wall 14A the hopper is biased by force of gravity to tilt forwardly about a transverse axis extending through the hopper.

Aligned with this reference transverse axis are a pair of trunnions 16 which protrude outwardly from opposite sides of the side walls 14A as indicated. The trunnions 16 are on an axis which would cause the hopper to tilt forwardly about the axis of the trunnions 16 unless restrained when the hopper is in an elevated position and supported upon the trunnions 16.

Our hopper lifting device is denoted by the reference character 18. The hopper lifting device is made up of a metal frame assembly wherein the separate parts are welded together as shown. In the rearward portion of the device 18 there is an upper transverse tube 19 and below it at a spaced distance a lower transverse tube 20, the tubes 19 and 20 being parallel to each other and arranged in a vertical plane. Interconnecting and spacing the two tubes 19 and 20 are two spaced vertical connecting bars 21. Also interconnecting the two tubes 19 and 20 and outboard therefrom are two rear frame members 23, also parallel to members 21. Intermediate the two members 21 are two spaced supplemental members 22 which are rigidly secured to the upper tube 19. The members 21 and 23 are welded to the tubes 19 and 20 to make a rigid construction.

The two connecting bars 21 and the supplemental members 22 are formed to have hook portions extending rearwardly therefrom. The hook portion of bars 21 are denoted by the reference character 21A and the hook portion of supplemental members 22 are denoted by the reference character 22A. These hook portions 21A and 22A hook over and engage the elevatable load supporting member 13 that is raised and lowered by the mast 12. Therefore, as the member 13 is raised and lowered, the members 21, 22 and 23 of the hopper lifting device are raised and lowered therewith.

Extending from the opposite ends of the tubes 19 and 20, parallel to each other, and rigidly secured to the rear frame members 23, is a frame assembly made up of a middle frame member 24, a lower frame member 25 and an upper frame member 26. These members 24, 25 and 26 are arranged in vertical planes on the opposite sides of the lifting device and together constitute side arms of the lifting device. These side arms are adapted to embrace or accommodate therebetween our hopper 14. The middle frame member 24 is generally horizontal and the frame members 25 and 26 extend to join at an apex at the forward end of the lifting device with the frame member 24. The arrangement provides for strength and rigidity for our hopper lifting device.

Formed in the forward free end of the lifting device where the frame members 24, 25 and 26 meet are recesses or dwells 27, the axes of the recesses or dwells being in alignment with each other. The recesses 27 have a size and form adapted to receive the trunnions 16, respectively, extending outwardly from the hopper 14. In the preferred arrangement the trunnions 16 and recesses 27 are such that the trunnions, unless restrained, may rotate in the recesses 27 along their common axes.

Carried by and rigidly secured thereto, such as by welding, to the frame members 24 are two abutment members 28. The two abutment members 28 extend inwardly of the hopper lifting device 18, that is toward each other. The forwardmost portion of each abutment member 28 is chamfered, as at 28, to facilitate the inter-engagement of the lifting device with the hopper.

The hopper 14 has welded thereto along its outer walls reinforcing members. There is a vertically disposed reinforcing member made of a lower portion 15C and an upper portion 15D, these portions being in alignment. Also there are reinforcing members 15A disposed in a horizontal plane, when the hopper is in its upright position, and which extends rearwardly from the upright reinforcing members 15C, 15D. These horizontal reinforcing members 15A are parallel to each other and extend outwardly from the outer side walls 14A of hopper 14. Interconnecting rearward ends of the reinforcing members 15A is a horizontally disposed reinforcing member 15B extending across the rearward wall 14C.

The horizontal reinforcing members 15A also constitute a pair of first stop members 15A in that they perform a function other than mere reinforcement. Also, the lower reinforcing member 15C constitutes a second pair of stop members, in that they also perform another function of being stops.

We provide a latch mechanism for retaining the hopper in an upright position such as shown in FIG. 1. This latch mechanism has a movable part 30 carried on a horizontally disposed rotatable shaft 32. A spring 31 biases the movable part 30 forwardly to a latching position. Three supporting brackets 33 welded to and carried by the upper tube 19 support the shaft 32 so as to permit the shaft 32 to rotate on its axis. An actuating lever rigidly secured to one end of the shaft 32 is provided for rotating the shaft 32 and thus to move the movable part 30 of the latch mechanism. A stub extension 34A on the lever 34 limits its forward swinging movement. A lanyard or rope 35 tied to the upper end of the lever 34 and secured in a convenient location on the lift truck 11 provides that the operator of the lift truck may readily actuate the latch mechanism by pulling upon the lanyard 35. Carried on the rear wall 14C of the hopper 14 is a fixed catch part 36 adapted to engage with the movable part 30 of the latch mechanism. The latch mechanism has its parts arranged in the usual manner so that in one line of movement the parts 30 and 36 readily interconnect on their own accord and are firmly inter-engaged until the part 30 is swung upwardly and rearwardly to dis-engage the part 36. The operation of the latch mechanism will be readily understood by those aquainted with the art of such latch mechanisms.

The operation of our improved apparatus may be understood by considering the hopper 14 first setting on a supported surface such as a floor. The truck 11 is then maneuvered so that the side arms of the lifting device embrace or straddle the rear portion of the hopper 14 so that the recesses 27 are positioned below the trunnions 16, respectively. Also at the same time the two abutment members 28 are positioned below the horizontal reinforcement members 15A which provide the first pair of stop members. Upon the truck and lifting device moving to this position, the latch mechanism will be automatically actuated so that the part 30 is inter-engaged with the part 36 on the hopper. Thereupon the lifting device 18 is raised by the load supporting member 13 so that the trunnions 16 are positioned within the recesses 27 and the abutment members 28 are positioned below and engage the pair of stop members made up of horizontal reinforcing members 15A. Thus with the hopper in a raised position such as shown in FIG. 1 there are four points of support for the hopper, these being trunnions 16 in recesses 27 and abutment members 28 engaging the under surface of the members 15A. With the hopper in any such desired elevated position, the truck 11 may be maneuvered to where any material in the hopper is to be dumped out. On reaching the location where the material is to be deposited, the lanyard 35 is pulled and this will dis-engage the latch mechanism. The bias of the hopper 14 containing the material is such that by force of gravity the hopper will tilt forwardly to the position shown in FIG. 2 and the material dumped therefrom.

Figure 2:
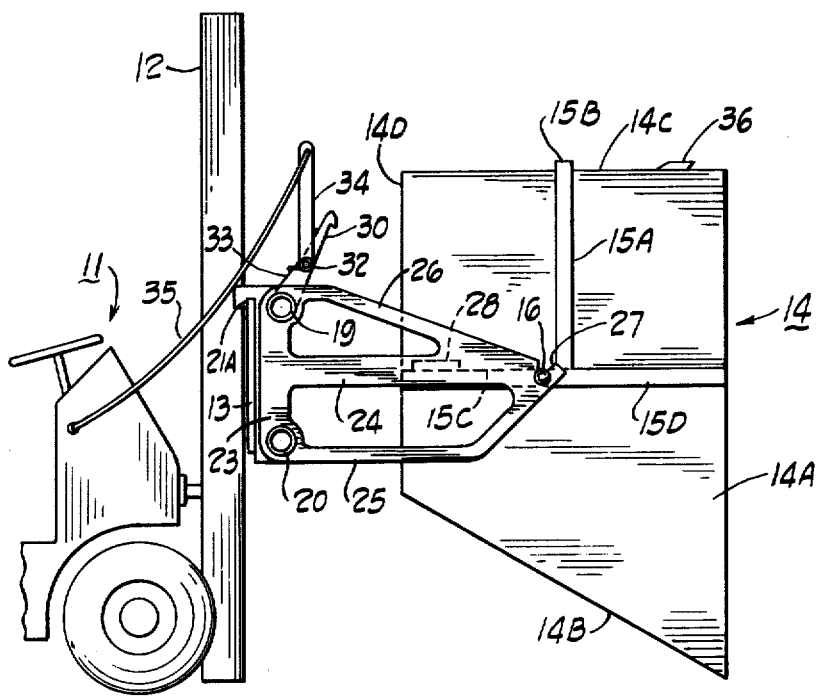
FIG. 2 is a view somewhat similar to that of FIG. 1 which shows the arrangement of the parts after the hopper has been tilted forwardly to dump out the contents thereof.
Figure 3:
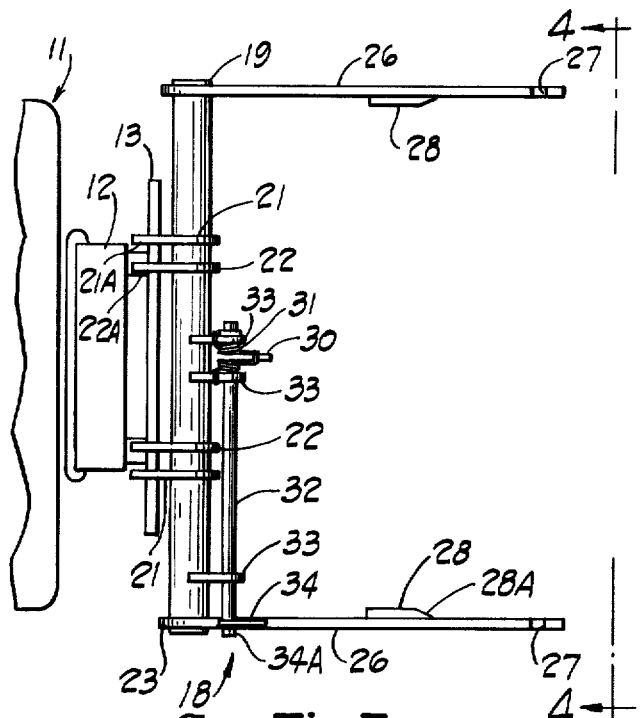
FIG. 3 is a plan view looking down upon our improved hopper lifting device attached to the mast of the industrial lift truck, and with the hopper removed from the same.
Figure 4:
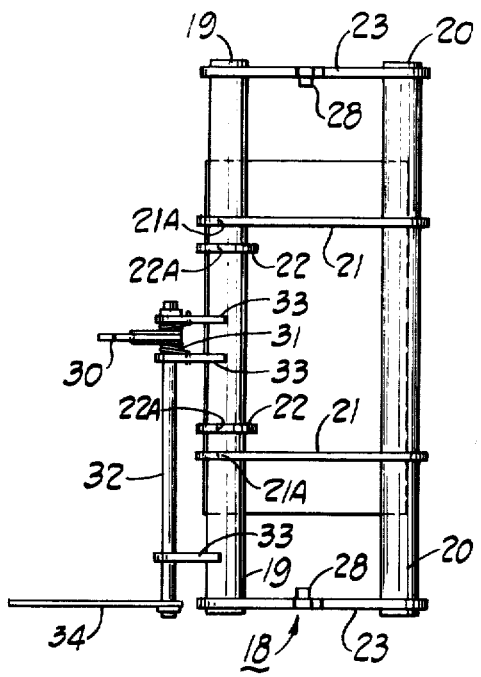
FIG. 4 is an end view of our hopper lifting device looking in the direction of the arrows 4—4 of FIG. 3.
Figure 5:
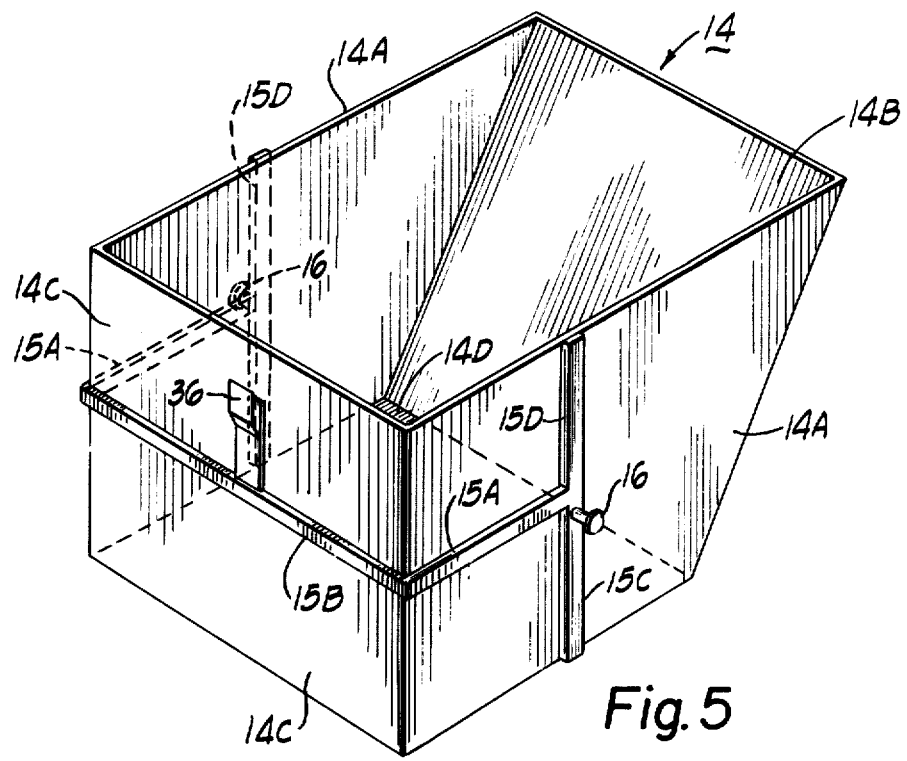
FIG. 5 is a perspective view of our improved hopper shown removed from the hopper lifting device.

When the hopper has been tilted forwardly to its position shown in FIG. 2, the abutment members 28 then engage the rearwardly facing surface of the reinforcing members 15C providing the described stops. Thus the abutment members 28 by engaging the members 15C also provide a limit whereby the hopper 14 may not rotate beyond more than what may be generally described as a right angle from its original upright position. This prevents a wild swinging or unrestrained tilting movement and thus the hopper will be either in its upright position in FIG. 1 or its tilted position in FIG. 2.

When it is desired to move the hopper after the dumping of its contents, the lifting device 18 is lowered and by the inter-engagement of the hopper with the floor surface, the hopper will return to an upright position upon the truck being moved rearwardly. The hopper will then rest on the floor with the bottom wall 14D engaging the floor surface and the hopper in upright position. When thus moved the latching mechanism will again automatically operate so that part 30 engages the fixed catch part 36. The hopper may then be raised by the elevation of the lifting device 18 to off the floor surface and the truck maneuvered to another location. Thus the hopper may be readily moved around. engaged, dis-engaged, tilted, moved to an upright position again, and moved about by the lift truck by the operator sitting in the lift truck, all without extraneous help.

This provides for great economy in time and manpower, for increased safety, for improved convenience and for greater flexibility in operation.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be restored to without departing from the spirit and scope of the invention as hereinafter claimed.

What is claimed is:

1. For use with an industrial lift truck having a mast assembly having an elevatable load-supporting member movable up and down along the mast assembly, material handling equipment comprising the combination of a hopper-lifting device attachable to said load-supporting member to be carried thereby, and a material-containable hopper (14) attachable to and detachable from said device and adapted to be raised and lowered with said device, said hopper having a pair of axially aligned trunnions (16) carried by and extending outwardly from opposite sides of hopper, the trunnions and hopper-lifting device being arranged so that said hopper tilts forwardly about the axis of said trunnions (16) in the absence of constraint, said hopper also having a first pair of abutment members (15A) carried by and extending outwardly from said opposite sides of said hopper at locations spaced rearwardly of said trunnions upon the hopper being in upright position and a second pair of abutment members (15C) extending outwardly from opposite sides of said hopper at locations downwardly of said trunnions upon the hopper being in upright position, said device having a transverse cross-member attached to said load-supporting member and having a pair of spaced side arms carried by said cross-member and extending forwardly thereof, each of said side arms adjacent the forward free end thereof having an upwardly opening recess (27), said recesses (27) being in axial alignment and being arranged to accommodate said trunnions (16) therein and to permit said hopper to rotatably tilt about the axis of said trunnions accommodated in the said recesses, respectively, and a stop member (28) carried by each said side arms at a location spaced rearwardly from the recess at the forward free end thereof, said stop members (28) being disposed to extend toward each other to engage said first pair of abutment members (15A) on the opposite sides of the hopper at said spaced locations upon said hopper being in upright position and to engage said second pair of abutment members (15C) upon said hopper being tipped forwardly from said upright position, and a latch mechanism having a first engaging part (30) carried by said hopper-lifting device and a second engaging part (36) carried by said hopper to selectably hold the hopper against tipping upon inter-engagement of said parts and to selectably release the hopper to permit it to tilt forwardly about said axis, the said arrangement permitting the side arms of said device to straddle said hopper when setting on the ground surface traversable by said lift truck to position the said trunnions above said recesses and said stop members (28) below said first pair of abutment members (15A) when the hopper is in upright position setting on said ground surface, and providing for the engagement of said trunnions by the side arms in said recesses and the engagement of said first pair of abutment members (28) by said stop members to permit the raising of the hopper to a higher level by said side arms and held in said upright position by said latch mechanism and providing for the forward tilting of the hopper about the axis of said trunnions and recesses upon the release of the hopper by said latch mechanism to the limit of tilting permitted by the engagement of said second pair of abutment members (15C) by said stop member (28), radial reference lines from said trunnion axis to the first mentioned pair of abutment members (15A) and radial reference lines from said trunnion axis to said second pair of abutment members (15C) being generally normal to each other, said second pair of abutment members (15C) being disposed to engage said stop members (28) upon the forward tilting of the hopper to limit the extent of said tilting to approximately a right angle.

2. Material handling equipment as claimed in claim 1, and in which said abutment members also constitute re-inforcing members secured to said hopper on the said opposite outer sides thereof and extending radially of said trunnions.

3. Material handling equipment as claimed in claim 1, and including actuating means secured to the movable part of said latch mechanism and extending for ready manipulation thereof from said industrical lift truck, the said movable part of the latch mechanism being carried by said hopper-lifting device and the fixed part of said latch mechanism being carried by said hopper.

4. The combinations claimed in claim 1 and in which said hopper and side arms are constructed and arranged that the hopper tilts forwardly about the axis of said trunnions (16) without restraint against such tipping, and in which the releasable latch mechanism is inter-connectable between said hopper and hopper lifting device at a location rearwardly of said axis to selectably maintain said hopper in upright position and to selectably release said hopper to permit it to rotatably tilt forwardly for the dumping of the load therefrom to the limit permitted by said second pair of abutment members (15C).

5. The combination claimed in claim 1 and in which said second pair of abutment members (15C) carried by and extensions outwardly from the said sides of the hopper are at a distance from said trunnion and at a distance from the first pair of abutment members (15A) to engage a first side of the respective stop members (28), said second pair of abutment members being arranged to engage an opposite side of the respective stop members (28) on said side arms upon the rotatable tilting of the hopper to dump the load therefrom and to limit the degree of rotation of the hopper about the said axis.

6. The combination claimed in claim 1 and in which, said latch mechanism has a fixed catch part carried by the hopper and a movable latch part carried by the hopper lifting device, and actuating mechanism for permitting automatic engagement of the movable latch part with said fixed catch part upon movement in a generally horizontal plane of the hopper and hopper lifting device toward each other, and for permitting manual selectable release of the movable latch part from the catch part, said actuating mechanism including means operable by the operator on said lift truck.

* * * * *